United States Patent
Jain et al.

(10) Patent No.: US 9,607,376 B2
(45) Date of Patent: Mar. 28, 2017

(54) METHOD AND APPARATUS FOR IMAGE SCORING AND ANALYSIS

(71) Applicant: DAKO DENMARK A/S, Glostrup (DK)

(72) Inventors: Rohit Jain, Ventura, CA (US); Joachim Helmut Schmid, Santa Barbara, CA (US); Mark Verardo, Ventura, CA (US); Jeffery Caron, Moraga, CA (US)

(73) Assignee: DAKO DENMARK A/S, Glostrup (DE)

( * ) Notice: Subject to any disclaimer, the term of this patent is extended or adjusted under 35 U.S.C. 154(b) by 0 days.

(21) Appl. No.: 14/817,508

(22) Filed: Aug. 4, 2015

(65) Prior Publication Data

US 2015/0339818 A1    Nov. 26, 2015

Related U.S. Application Data

(63) Continuation of application No. 13/891,301, filed on May 10, 2013, now Pat. No. 9,135,700.

(60) Provisional application No. 61/646,212, filed on May 11, 2012.

(51) Int. Cl.
  *G06K 9/00*     (2006.01)
  *G06T 7/00*     (2017.01)
  *G06T 7/60*     (2017.01)

(52) U.S. Cl.
  CPC .......... *G06T 7/0012* (2013.01); *G06K 9/0014* (2013.01); *G06T 7/0081* (2013.01); *G06T 7/60* (2013.01); *G06T 2207/10024* (2013.01); *G06T 2207/10056* (2013.01); *G06T 2207/20144* (2013.01); *G06T 2207/20148* (2013.01); *G06T 2207/30024* (2013.01); *G06T 2207/30068* (2013.01)

(58) Field of Classification Search
  CPC . G06T 2207/30068; G06T 2207/10056; G06T 7/00; G06T 7/60
  USPC ......................................... 382/133
  See application file for complete search history.

(56) References Cited

U.S. PATENT DOCUMENTS

| 7,899,624 B2 | 3/2011 | Cualing et al. |
| 2010/0111396 A1 | 5/2010 | Boucheron |
| 2011/0111435 A1* | 5/2011 | Dobson ................ G01N 33/566 435/7.23 |

FOREIGN PATENT DOCUMENTS

| WO | 2005045734 A1 | 5/2005 |
| WO | 2006020627 A1 | 2/2006 |

OTHER PUBLICATIONS

Jones et al., "Voronoi-Based Segmentation of Cells on Image Manifolds", Retrieved from Internet on Jan. 29, 15, retrieved from URL /people.csail. mit.edu/thouis/Jon esCVBIA2005.pdf>.

(Continued)

*Primary Examiner* — Gregory F Cunningham

(57) ABSTRACT

Methods and systems for image scoring and analysis are provided. Scored and analyzed images may include digital pathology images. Image scoring and analysis methods may include techniques to identify nuclei and determine membrane staining extent through the use of a priori models. Image scoring and analysis methods may include techniques for membrane intensity determination. Images may be scored based on an extent of membrane staining and membrane intensity.

20 Claims, 20 Drawing Sheets

(56) References Cited

OTHER PUBLICATIONS

Lesack et al., "Performance of a simple chromatin-rich segmentation algorithm in quantifying basal cell carcinoma from histology images" Retrieved from Internet on Jan. 29, 2015. Retrieved from /www.biomedcentral.com/contentJpdf/1756-0500-5- 35.pdf>.
Masmoudi, et al., "Automated Quantitative Assessment of HER-2/neu Immunohistochemical Expression in Breast cancer", IEEE Transactions on Medical Imaging. IEEE Service Center, Piscataway, NJ, US, vol. 28, No. 6, Jun. 1, 2009, 916-925.
Sun, et al., "Membrane boundary extraction using circular multiple paths", Pattern Recognition, Elsevier, GB, vol. 42, No. 4, Apr. 1, 2009, 523-525.
"Supplementary European Search Report" dated Sep. 5, 2016, Application No. 13787370.9.

\* cited by examiner

METHOD AND APPARATUS FOR IMAGE SCORING AND ANALYSIS

CROSS-REFERENCE TO RELATED APPLICATIONS

This application is a continuation of U.S. patent application Ser. No. 13/891,301, filed May 10, 2013, which claims the benefit of priority under 35 U.S.C. §119(e) to U.S. Provisional Application No. 61/646,212, filed May 11, 2012, all of which are incorporated herein by reference in their entirety.

TECHNICAL FIELD

Aspects of the present disclosure relate to the analysis and scoring of digital pathology images captured from stained tissue samples.

BACKGROUND OF THE INVENTION

Conventional pathology image analysis methods utilize human labor to individually examine and label stained pathology images. This practice requires a great deal of human labor, is time consuming, and is subject to the subjectivity of the pathologist. In response to these constraints, various automated image analysis and scoring techniques have been developed.

Digitized pathology images for analysis are created from tissue samples stained with different methods for different diagnosing purposes, such as H&E (hematoxylin and eosin) and IHC (immunohistochemical) staining Both of these staining methods are widely used in pathology, and are common for use in biopsy of suspected cancerous tissue. In one common technique, diaminobenzadine (DAB) a chromogenic substrate of horse radish peroxidase (HRP) may be used for visualizing target proteins in tissue samples which have been labeled with peroxidase activity. Samples are frequently counterstained, for example with hematoxylin, to provide visual contrast. The method may serve to identify target proteins, such as Human Epidermal Growth Factor Receptor 2, a protein associated with cancerous breast tissue and other cancerous tissues, such as gastric tissue. Identifying and assessing the prevalence of target proteins within a tissue sample may aid in the diagnosis and treatment of various medical conditions. In the case of Her2, identification may assist in the diagnosis and treatment of breast cancer, gastric cancer, and other conditions associated with Her2 prevalence.

Assessing the intensity and extent of membrane staining may be performed manually, by a pathologist visually observing each image and providing scores for each assessment. A pathologist may be assisted by various digital imaging technologies to allow for manipulation of digital images. Additionally, automated analysis and scoring methods exist for determining intensity and extent of membrane staining Conventional automated analysis and scoring methods may be based on conventional image analysis techniques, such as feature extraction and object recognition. These techniques, although faster than manual techniques performed by a pathologist, may be resource intensive and time consuming.

SUMMARY OF A FEW ASPECTS OF THE DISCLOSURE

A novel and efficient method for automated scoring of Her2 expression in a stained tissue sample is provided. In order to increase the efficiency and accuracy of pathology laboratory operations, methods to reduce the resource intensiveness of digital pathology analysis and scoring may be useful. The methods and techniques disclosed herein are able to estimate staining intensity and extent of membrane staining in a given region of interest and them combine these two estimates according to any standardized rule set (e.g. Dako herceptest scoring guidelines or ASCO/CAP scoring guidelines) to calculate an overall Her2 expression score. The methods and techniques disclosed herein utilize various predetermined thresholds, parameters, and models to increase efficiency and permit accurate estimation of characteristics of a stained tissue sample.

One exemplary embodiment of the disclosure includes a method for analyzing a digital pathology image. The method includes selecting at least one analysis region in the digital pathology image, separating the at least one analysis region into a tissue region and a background region using a predetermined separation threshold, selecting nuclei within the tissue region, designating a membrane region according to the tissue region and the nuclei refining the membrane region according to at least one predetermined refinement parameter, and generating an intensity score of the refined membrane region according to a predetermined model.

Another exemplary embodiment includes a method for analyzing a digital pathology image. The method includes selecting an analysis region of the digital pathology image, separating a tissue region and a background region in the analysis region of the digital pathology image using a predetermined separation threshold, selecting nuclei within the tissue region, calculating a nuclear perimeter of the nuclei, determining an estimated membrane perimeter based on the nuclear perimeter according to an a priori cell model, designating a membrane region according to the tissue region and the selected nuclei, calculating an actual membrane perimeter of the membrane region, and calculating staining extent by comparing the estimated membrane perimeter and the actual membrane perimeter.

In yet another exemplary embodiment consistent with the present disclosure, a system for analyzing a digital pathology image includes a non-transitory computer readable medium comprising instructions and at least one processor. The at least one processor may be configured to carry out the instructions to select at least one analysis region in the digital pathology image, separate the at least one analysis region into a tissue region and a background region using a predetermined separation threshold, select nuclei within the tissue region, designate a membrane region according to the tissue region and the nuclei, refine the membrane region according to at least one predetermined skeletonization parameter, and generate an intensity score of the refined membrane region according to a predetermined model.

In still another embodiment consistent with the present disclosure, a system for analyzing a digital pathology image includes a non-transitory computer readable medium comprising instructions and at least one processor. The at least one processor may be configured to carry out the instructions to select at least one analysis region in the digital pathology image, separate the at least one analysis region into a tissue region and a background region using a predetermined separation threshold, select nuclei within the tissue region, determine an estimated membrane perimeter based on the nuclear perimeter according to an a priori cell model, designate a membrane region according to the tissue region and the selected nuclei, calculate an actual membrane perimeter of the membrane region, and calculate staining extent by comparing the estimated membrane perimeter and the actual membrane perimeter.

DETAILED DESCRIPTION OF THE INVENTION

Figure 1:
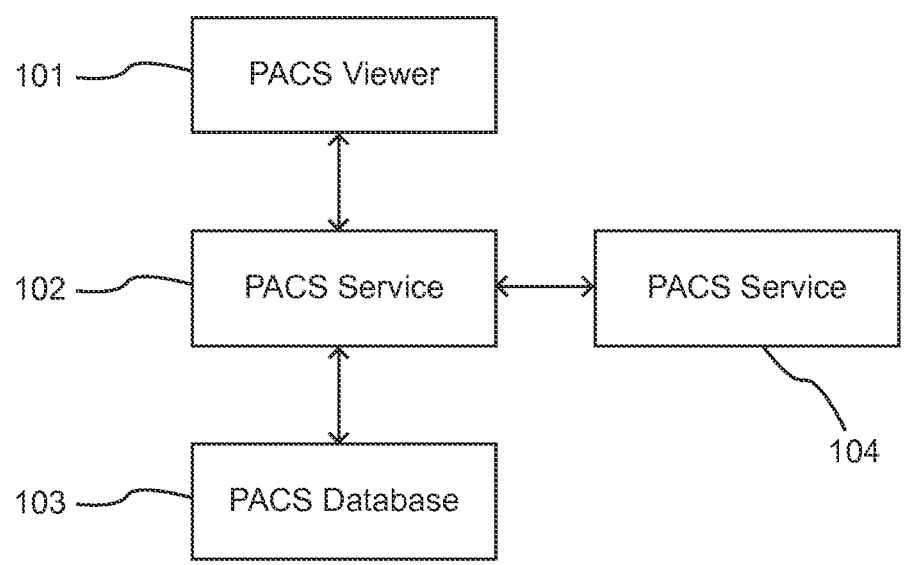
FIG. 1 illustrates an overview of a system for performing the image analysis and scoring methods and techniques disclosed herein.

Reference will now be made in detail to exemplary embodiments as with reference to the accompanying drawings. Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be interpreted in a limiting sense.

Unless otherwise defined, all technical and/or scientific terms used herein have the same meaning as commonly understood by one of ordinary skill in the art to which the embodiments of the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Exemplary disclosed embodiments may include devices and methods for analyzing digital pathology images. Digital pathology images may include images of tissue samples obtained through any suitable imaging means, including, for example, digital microscopy and digital slide scanning Digital pathology images may also be obtained from digital storage databases. Analysis techniques implemented by disclosed methods and devices may be suitable for assessing Her2 expression in obtained tissue sample. Disclosed methods and devices may be used to estimate staining intensity and staining extent in a selected region of interest. These estimates may be used according to standardized or customized rule sets to calculate an overall Her2 expression score for a selected region. Multiple selected regions may be used to generate an overall Her2 expression score for an entire digital pathology image, or an entire tissue sample. While the following disclosure makes reference to image analysis techniques perform on selected regions of interest represent portions of a digital slide image, it is to be understood that a selected region of interest may represent the entirety of a digital slide image.

HER2 expression can be identified within different locations in cancer cells. For example, the antigen is commonly found in the cell membrane and/or cytoplasm. Interpreting the results of a stained tissue sample involves identifying the cellular localization of the stain, assessing the intensity of staining, and estimating the morphologic extent of this staining. As used herein, the "extent" of staining refers to a pattern of staining that meets accepted morphologic scoring standards based on cell and tissue type. For example, in some cancers, such as breast cancer, Her2 protein is expressed most abundantly in the cell membrane. Therefore IHC staining of these types of cancers cells results in darker staining of cell membranes. Individual tumor cells within the invasive breast cancer may exhibit membranous cellular distribution of staining to differing extents. Some cells may display complete circumferential staining, i.e., staining that is unbroken in intensity and color around the entire perimeter of the cell. Thus, in some contexts, the "extent" of staining may refer to the percent completion of membrane staining. In contrast, other cells exhibit staining that involves only a portion of the cell membrane, a phenomenon that is termed partial membrane staining Clinical studies have determined that the relevant diagnostic characteristic of breast cancer is the proportion of cells that exhibit complete membrane staining. In another example, gastric carcinoma, the extent of the membranous cellular distribution of staining is more commonly observed to be only partial, with the greatest staining noted in the basolateral and/or lateral portions of the cell membrane. Clinical studies have demonstrated that this extent of staining, even though it does not encompass the entirety of the membrane perimeter, is the diagnostic hallmark of Her2 expressing gastric tumors, and may thus be considered complete staining with respect to gastric tumors. In additional examples, extent of staining may refer to a measure percentage of cells exhibiting staining of a selected pattern. For example, extent of staining may refer to the percentage of cells exhibiting complete circumferential membrane staining or complete basolateral staining Membrane staining with increased intensity is associated with a higher expression of the Her2 protein, while the extent of staining is associated with the type of tumor and the growth pattern of the malignant cells within this tumor. Guidelines for translating intensity of membrane staining and extent of membrane staining into clinical diagnoses are published by the American Society of Clinical Oncology and the College of American Pathologists (e.g., ASCO/CAP guidelines) as well as by the makers of various staining kits and protocols (e.g. Dako HercepTest© guidelines). Different staining kits and protocols, such as the Dako HercepTest kit, may produce different visual results due to differing chemical composition and protocol steps, and guidelines tailored to the particular kit and protocol may be necessary.

For illustrative purposes, many of the methods and techniques described herein are described with respect to a particular tissue and/or tumor type, for example, breast cancer. In such an exemplary case, the extent of membrane staining may be described with respect to clinical diagnosis guidelines. That is, a method or technique described using breast cancer tissue as example may refer to the extent of membrane staining with reference to the percentage completion of staining Such exemplary description is not limiting, and the methods and techniques for determining the extent of membrane staining in breast cancer tissue, i.e. percentage completion, apply as well to other types of tissue, e.g. gastric cancer tissue.

The various embodiments and methods described herein may reduce the computational burden associated with digital pathology analysis and scoring.

FIG. 1 illustrates an overview of an exemplary system for performing the image analysis and scoring methods and techniques disclosed herein. FIG. 1 shows the components of a Picture Archiving and Communication System (PACS) 100, in communication with a component for performing the methods and techniques disclosed herein. Illustrated are a PACS viewer 101, PACS service component 102, and PACS database 103. In communication with the PACS service component 102 is an image analysis component 104. Each of the illustrated components may reside in a single system, or may be distributed on multiple systems in communication with each other. The illustrated components may also be implemented as part of a cloud computing service.

The illustrated PACS 100 is exemplary only, and the image analysis and scoring methods and techniques disclosed herein may be implemented by any suitable computational hardware, including, for example, a processor having access to a non-transitory computer readable medium, or media, storing images to be analyzed and/or instructions for carrying out the techniques disclosed herein. It is not required that digital images for analysis and implementation instructions be stored on the same medium. Digital images for analysis may be stored using any suitable storage system, including databases and other archive formats.

Figure 2:
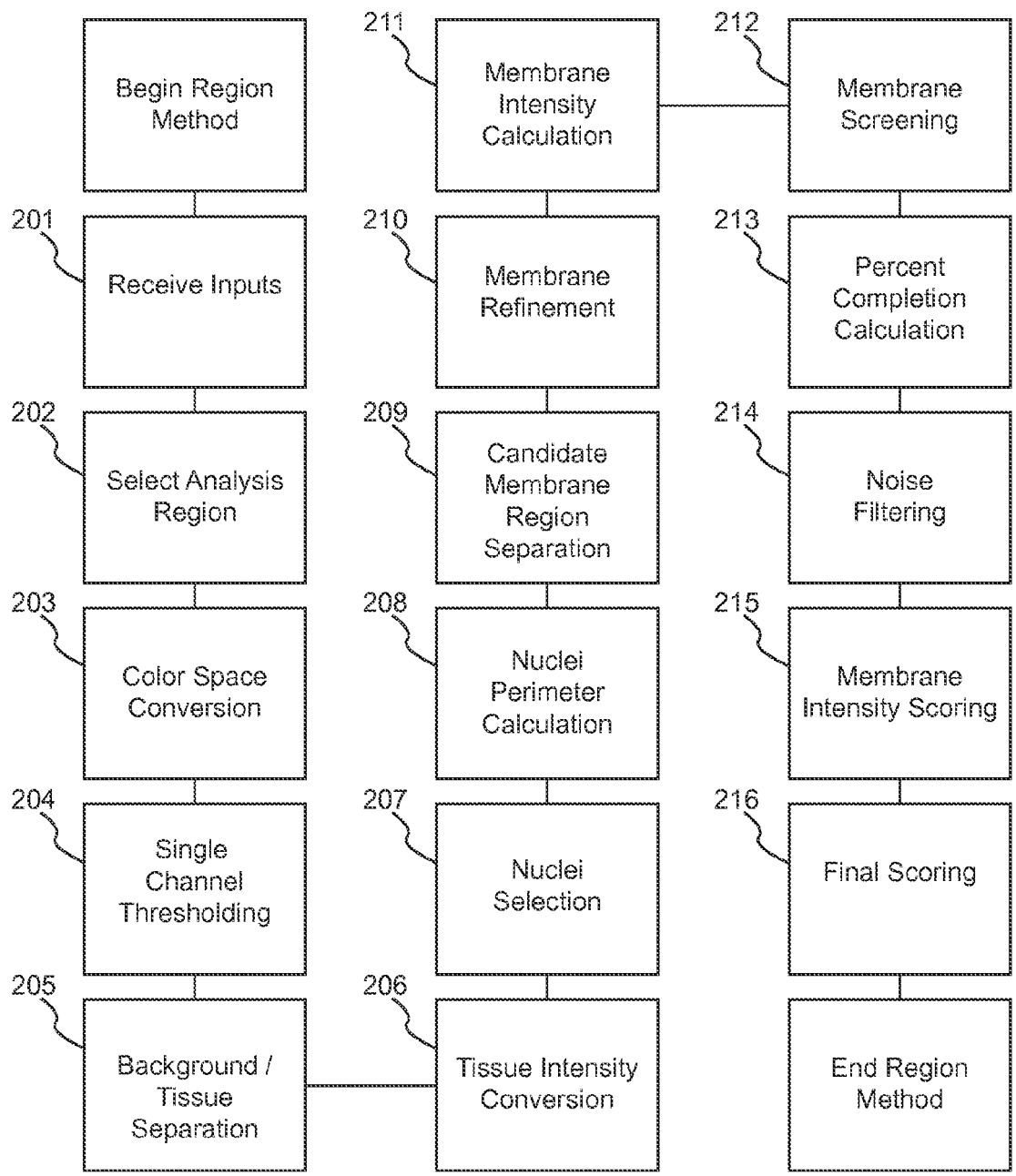
FIG. 2 is a flow chart depicting steps in an exemplary method for computing a staining expression score of a selected region of a digital pathology image.

FIG. 2 is a flow chart depicting the steps in a method for computing a Her2 expression score of a selected region of a digital pathology image. The steps of the method shown will be now be explained with further reference to FIGS. 3-16. The disclosed method may receive as an input, at step 201, an obtained digital pathology image. In an exemplary embodiment, a digital pathology image may be obtained by capturing an image of a biological tissue specimen through any suitable means, including digital microscopy and digital slide scanning. In another exemplary embodiment, a digital pathology image may also be obtained from a digital storage database.

Throughout the description of the apparatus and methods of the disclosure, references may be made to specific exemplary illustrative images. It should be understood that the image processing methods disclosed do not require the actual display of the illustrative images. Because the images may be digitally represented, they may be also be digitally manipulated and analyzed without display. As used herein, the term digital image may refer to the data that, when processed by a suitable display means, provides a visual representation. Furthermore, the steps disclosed herein are described in a particular order and in particular combinations for exemplary and explanatory purposes only. Steps may be performed in different order or in combination with other steps without compromising the results.

An exemplary digital pathology image may include color information for each pixel of the image. The color information may be stored as multiple channel values in a color space. Each channel value may specify a level of a pixel component, for example, color or luminosity, in a single channel of the color space. The color space may include one or more channels. An exemplary grayscale image may include a single channel specifying a gray level between white and black for each pixel. Exemplary color images may include three channels. Examples of three channel color spaces include, red, green and blue color channels in an RGB color space, and luma, blue-difference, and red-difference in a Y'CbCr color space. Exemplary embodiments of the methods and techniques disclosed include images with color information stored in a single channel grayscale color space, images with color information stored in an RGB color space, images with color information stored in a Y'CbCr color space, as well as images with color information stored in custom color spaces. The color spaces described with respect to specific embodiments herein are exemplary only, and a person of skill in the art will recognize that the methods and techniques disclosed herein may also be generalized to work with other color spaces, in any number of channels, including, for instance RGB, HSI (Hue-Saturation-Intensity), YCbCr (luminance, blue difference, red difference), and any other suitable color spaces either known in the art or custom created. Suitable digital pathology images may also include channels containing non-color data, such as temperature and roughness. For exemplary purposes only, embodiments disclosed herein are discussed with respect to a data space having three color channels, [similar to] the Y'-Cb-Cr color space. The techniques and methods discussed herein are not, however, limited by the choice of data space. Alternative data spaces, having any number of channels containing color information or other data may similarly be utilized in conjunction with the methods and techniques discussed herein without departing from the scope of the invention.

Figure 3:
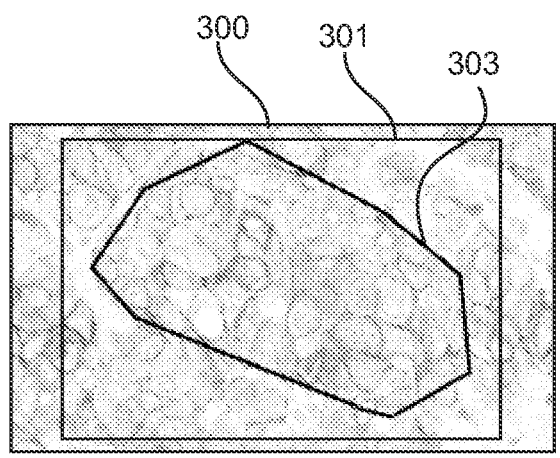
FIG. 3. illustrates the selection of an analysis region within a digital pathology image.

At step 202 in FIG. 2, an analysis region 301 in the digital pathology image 300 is selected. FIG. 3. illustrates the selection of an analysis region within digital pathology image 300. A selected region of interest i.e. analysis region, may be rectangular, such as illustrated analysis region 301 and may be a region of any desired shape, for example, an irregular polygon as illustrated by analysis region 303. An analysis region may be drawn by a user or operator, e.g. a pathologist, in a shape suitable to include cell types or tissue type to be scored, e.g. tumor cells within the analysis region 301, 303 and to exclude other cell types e.g. connective tissue, normal stromal cells, non-cancerous cells, and so forth, as being outside the region of interest and therefore not included in the analysis. As described above, in some embodiments, a selected analysis region may include the entirety of a digital slide image. In such embodiments, analysis region selection step 202 may be omitted entirely.

For exemplary purposes only, methods and techniques described herein refer to analysis performed on analysis region 301. The methods described may be equally applied to alternatively shaped analysis regions, such as polygonal analysis region 303. Analysis region 301 may be selected to improve efficiency of the analysis method, permitting smaller parts of a larger image to be analyzed separately. Analysis region 301 may be selected based on specific areas of interest of the digital pathology image 300, as determined by an operator or an image processing system. Analysis region 301 may be selected by an operator, may be determined by an image processing system based on image characteristics, and may be determined by an operator working in coordination with an image processing system. An operator, such as a pathologist, may select analysis region 301 based only on the image itself, relying on the operator's experience to determine an appropriate region. Analysis region 301 may also be selected automatically by an image processing system. Automatic selection may be performed, for example, to ensure that an entire digital image is analyzed region by region. Automatic selection may also be performed based on image characteristics determined during pre-analysis computations to determine areas of interest, such as potential tumor areas. Analysis region 301 may also be selected by an operator working in coordination with an image processing system. An image processing system may suggest areas of interest to an operator based on pre-analysis computations. The operator may then confirm, deny, and modify suggestions made by the image processing system. Further, the image processing system may, through machine learning techniques, use the operator's modifications to improve future suggestions. In an alternative embodiment, an operator may select an analysis region 301 and an image processing system may provide feedback to the operator, based on pre-analysis computations, on the quality of the operator's selection.

Image coordinates defining analysis region 301 may serve as input to color space conversion step 203 in FIG. 2. Additionally, step 203 may receive additional inputs, including, for example, image scanner and staining specific thresholds, feature size thresholds, mappings for intensity transformations, rules for scoring and interpretation, scanning parameters, staining parameters, sensing parameters for additional sensing modalities, and other method parameters required by the step 203 and the following steps.

Figure 4:
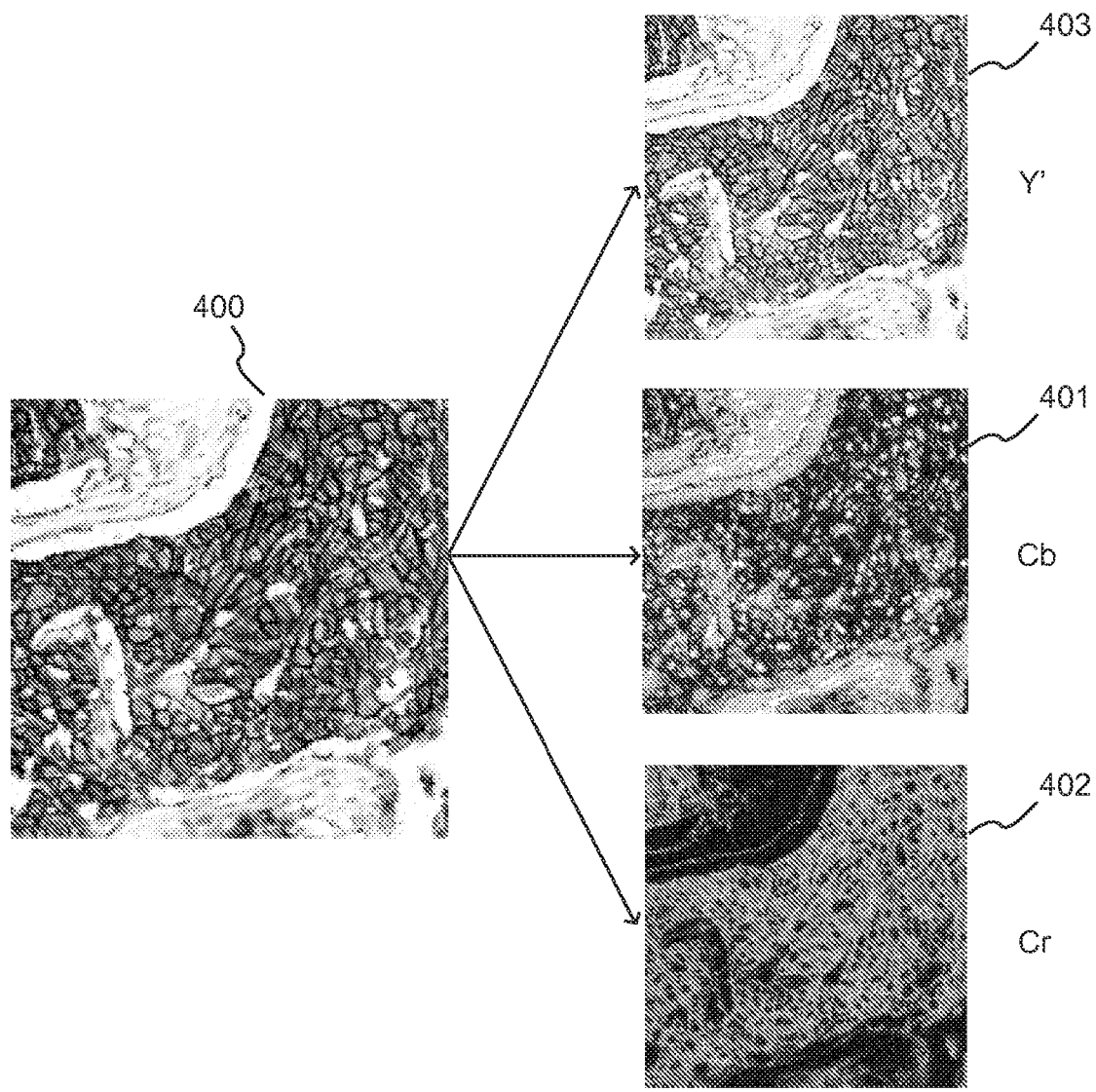
FIG. 4 illustrates an exemplary color space conversion.

FIG. 4 illustrates an exemplary color space conversion step 203. Digital pathology image 400 represents image analysis region 301 selected in step 202. As obtained from the previous step, digital pathology image 400 may include color information stored in an 8-bit (i.e. 256 values per channel) RGB color space. The color information of digital pathology image 400 may be converted into color information stored in a Y'CbCr space according to the following equations.

$$Y' = +(0.299 \cdot R'_D) + (0.587 \cdot G'_D) + (0.114 \cdot B'_D))$$

$$C'_B = 128 - (0.168736 \cdot R'_D) - (0.331264 \cdot G'_D) + (0.5 \cdot B'_D))$$

$$C'_B = 128 + (0.5 \cdot R'_D) - (0.418688 \cdot G'_D) + (0.081312 \cdot B'_D)$$

In some embodiments consistent with the present disclosure, a three channel color space similar to the Y'CbCr space may be used, wherein custom values for the constants in the above equations are computed through data analysis to improve the accuracy and efficiency of the methods and techniques described herein. The following description refers to the channels of a Y'CbCr color space for exemplary purposes only.

As illustrated in FIG. 4, each channel of an exemplary three channel color space may be represented by a single channel grayscale image. Thus, as an example, digital pathology image 400 may be divided into Y' channel image 403 representative of a first channel value of pixels throughout the original image 400, Cb channel image 401 representative of a second channel value of pixels throughout the original image 400, and Cr channel image 402 representative of a third channel value of pixels through the original image 400.

As disclosed above, although the exemplary embodiments described herein utilize conversion from an RGB to analytically relevant transformed color space, the methods described may be generalized to any known or custom color space, and further generalized to data spaces containing non-color data channels. For datasets with more than three channels, PCA (principal components analysis) or similar techniques, including supervised learning methods, could be used on a large representative dataset to design spatial transformations for maximum discriminatory relevance.

In some embodiments consistent with the disclosure, analysis region 301 may be separated into a tissue region and a background regions using a predetermined separation threshold 510. This separation may be understood with respect to FIGS. 5 and 6.

As used herein, the term "predetermined" may refer to thresholds, parameters, and other constant values used in the automated image analysis methods and techniques disclosed herein. Such thresholds, parameters, and values may be predetermined by characteristics of an employed model, may be predetermined based on supervised learning of sample data, and may be predetermined using a combination of both methods.

Figure 5:
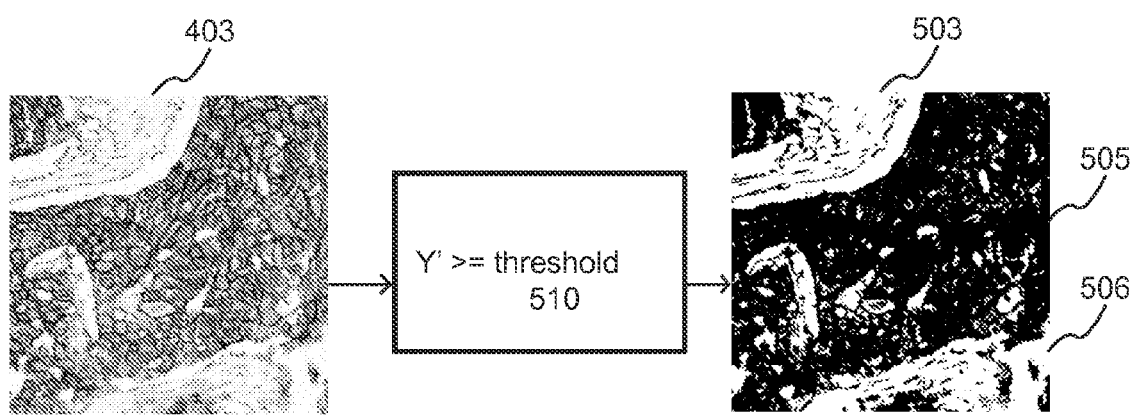
FIG. 5 illustrates an exemplary thresholding step for a single channel image to separate specific image areas.

FIG. 5 illustrates a step 204 for thresholding a single channel image to separate specific image areas. In the exemplary embodiment illustrated, Y' channel image 403, representing a single channel of analysis region 301, is converted into a binary mask 503 based on a separation threshold value 510 in order to separate analysis region 301 into a tissue region 505 and a background region 506. Background region 506 may represent any area not of interest for further analysis. In the exemplary embodiment illustrated, background region 506 represents non-tissue slide areas.

In an exemplary embodiment, binarizing Y' channel image 403 into binary mask 503 may be performed by converting each pixel of the image into either a black pixel representing tissue area when a pixel value in the Y' channel is greater than an separation threshold value 510 or a white pixel representing a background region when a pixel value in the Y' channel is less than the separation threshold value 510. The black and white pixels illustrated in FIG. 5 are just one way of representing binary mask 503, and any other binary representation may also be used. Similarly, binarization may be performed on non-color data channels by comparison to a non-color separation threshold value 510.

The single channel separation threshold value 510 for determining inclusion in a tissue region or a background may be predetermined. A predetermined separation threshold 510 may be determined specifically for use with a particular staining kit and protocol. A predetermined separation threshold 510 may be computed by running multiple clustering algorithms on a large set of analysis regions taken from multiple slides stained with the kit and protocol and showing a large color range of tissue staining expression. The results of the multiple clustering algorithms may then be analyzed in multiple color spaces to determine a specific separation threshold value 510. Determining a separation threshold value 510 may be computationally intensive; predetermining separation threshold value 510 may thus permit increased speed in the performance of the image analysis method. Predetermined separation threshold values may be limited to usage with the particular staining kit and protocol for which they are determined. Different staining kits and protocols may require the determination of different separation threshold values. Similarly, supervised learning techniques could be used to select an appropriate threshold value or separation algorithm.

Figure 6:
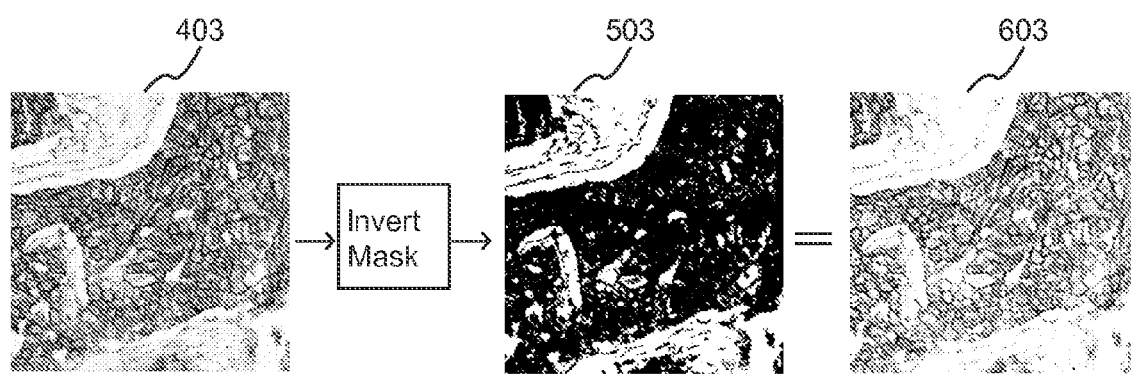
FIG. 6 illustrates an exemplary use of a binary mask to separate regions within an image.

FIG. 6 illustrates the use of a binary mask to separate regions within an image. Referring again to FIG. 2, separation step 205 may be performed to separate tissue areas from non-tissue background areas in each of Cb channel image 401, Cr channel image 402, and Y' channel image 403. In the exemplary embodiment illustrated in FIG. 6, binary mask 503, created from the Y' channel image 403 using a predetermined threshold 510, is used to separate a tissue region from a background region in Y' channel image 403 to produce Y' channel tissue image 603. Binary mask 503 may be inverted and applied to Y' channel image 403 to remove any portions of the image that correspond to a background region, for example, a slide area. The value of each pixel of Y' channel image 403 corresponding to white pixels of binary mask 503, i.e. pixels having an intensity value lower than the predetermined separation threshold 510, may be converted to a single value signifying background tissue. For example, any pixel value that does not meet the predetermined separation threshold 510 may be converted into a white pixel. The method as illustrated in FIG. 6 may be applied at separation step 205 to Cb channel image 401 and Cr channel image 402 to separate tissue from background regions to produce Cb channel tissue image 601 (not shown) and Cr channel tissue image 602 (not shown). The tissue images resulting from the separation step may further be used as inputs to steps to be performed later in the method. With respect to each channel, separation step 205 may be performed at any time during the scoring method prior to the use of that channel's tissue image.

For exemplary illustrative purposes, steps 204 and 205 have been described as multiple steps. These steps may, however, be combined into a single step wherein each pixel of Y' channel image 403 is compared to a predetermined separation threshold 510. If the pixel exceeds the threshold 510, it and corresponding pixels in Cb channel image 401 and Cr channel image 402 may be left alone. If the pixel of Y'channel image 403 does not exceed the threshold 510, it and corresponding pixels in Cb channel image 401 and Cr channel image 402 may be converted to a value signifying background tissue.

In exemplary disclosed embodiments, the Y' channel of a Y'CbCr color space may be used to separate regions within digital pathology image 400 because the Y' channel represents the luma, or color independent brightness, of the pixel. Thus, no matter the actual color of the pixel, the Y' channel captures an intensity of the pixel. In alternative embodiments, other measures may be used for determining a separation threshold for the step of separating regions within digital pathology image 400. Techniques disclosed herein are not limited to either the use of a Y' channel for a separation threshold or to the use of an intensity value for a separation threshold. Values of any other single channel may be used, for example the Cb and Cr values in a Y'CbCr color space, or the R, G, and B values in an RGB color space. Color independent intensity values in a different color space may be used, for example the intensity value in an HIS color space. Furthermore, combinations of channel values may be used, for example, a combination of the R, G, and B values in an RGB color space. The use of different color spaces and/or different data spaces may require the generation of different predetermined separation thresholds.

Figure 7:
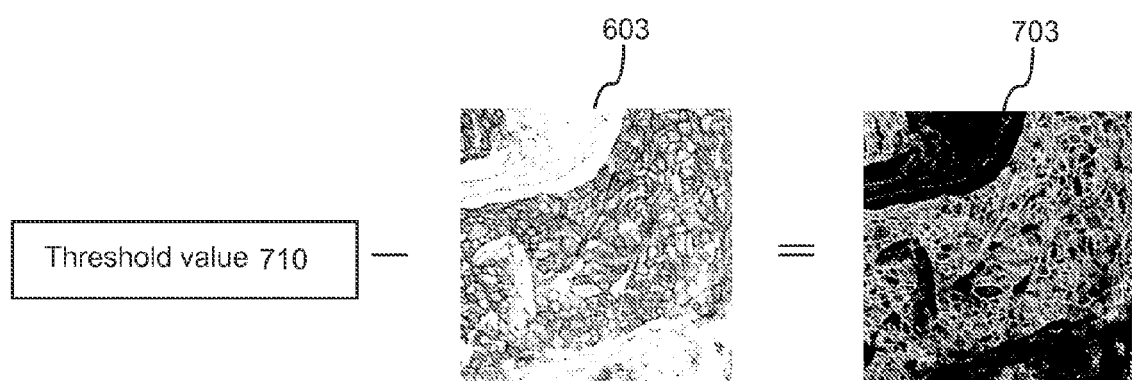
FIG. 7 illustrates an exemplary conversion of a single channel tissue image into a tissue area stain intensity image.

Returning to FIG. 2, Y' channel tissue image 603 may be used with a predetermined conversion threshold 710 at tissue intensity conversion step 206 to generate a tissue stain intensity image. FIG. 7 illustrates the conversion of Y' channel tissue image 603 into tissue area stain intensity image 703. Exemplary embodiments discussed herein utilize a Y' channel for both thresholding and background region separation steps 204, 205 and for the succeeding steps 206-216. However, it is not necessary that these steps be performed utilizing the same channel, or even the same color or data space. Any suitable color and/or data spaces or channels, whether custom or known in the art may be utilized to perform these various steps.

Tissue area stain intensity image 703 may be generated by subtracting all pixel values of Y' channel tissue image 603 from a predetermined conversion threshold value 710. The Y' channel is thus inverted from luma to absorption. The absorption values thus obtained may be representative of tissue staining intensity. In some embodiments, it may be efficient to use the same predetermined separation threshold 410 that was used for thresholding step 204 as the predetermined conversion threshold value 710. In alternative embodiments, a separate predetermined conversion threshold value 710 may be generated in manner similar to that described above with respect to the predetermined separation threshold value 410. Tissue area stain intensity image 703 may be reserved for use during subsequent steps in the algorithm.

In some exemplary embodiments, nuclei within the tissue region may be selected according to a comparison between a second channel value and a third channel value. Referring again to FIG. 2, nuclei selection step 207 may be performed to select nuclei within the tissue region.

Figure 8:
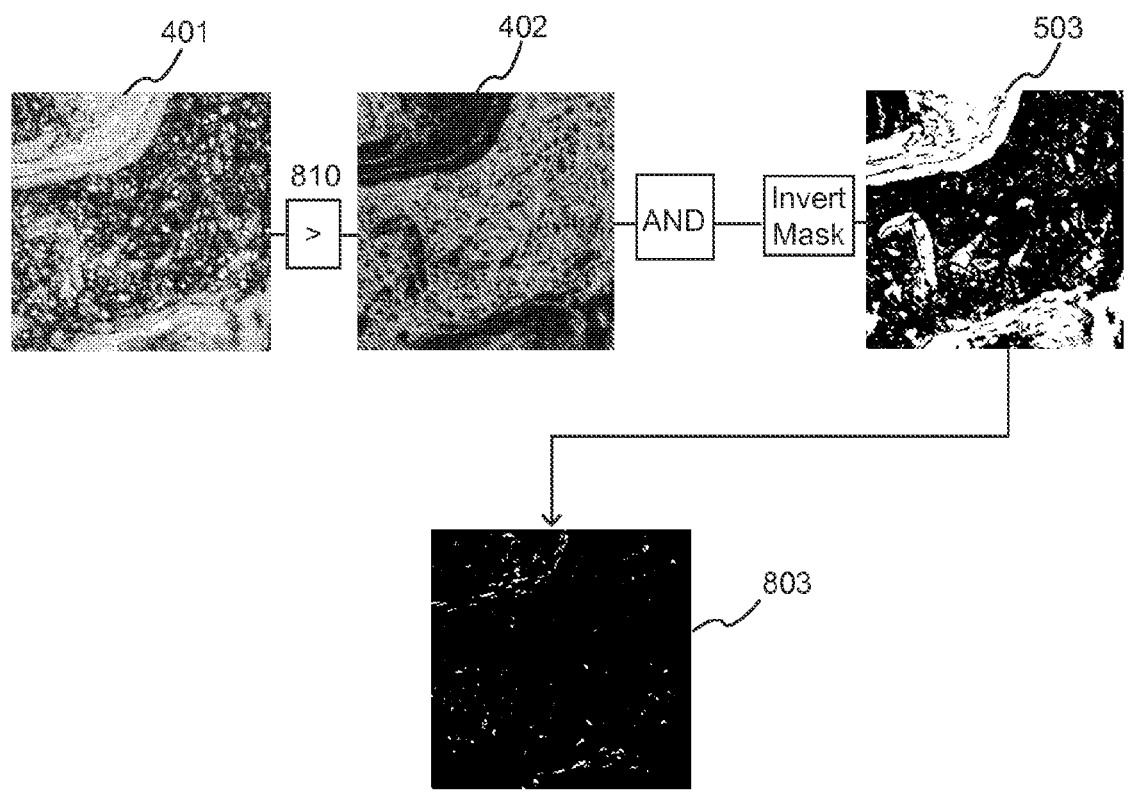
FIG. 8 illustrates an exemplary nuclei selection step performed within a tissue region according to a comparison between two digital image channel values.

FIG. 8 illustrates an exemplary nuclei selection step 207 performed within the tissue region according to a comparison between the Cb and Cr channel values. Comparison between Cb and Cr may be based on a predetermined selection function 810. A predetermined selection function 810 may be determined specifically for use with a particular staining kit and protocol. A predetermined function 810 may be computed by running multiple clustering algorithms to identify common color characteristics of nuclei on a large set of analysis regions taken from multiple slides stained with the kit and protocol and showing a large color range of tissue staining expression. The results of the multiple clustering algorithms may then be analyzed to determine a function 810 to select nuclei in the tissue based on Cb and Cr values. Determining the selection function 810 may be computationally intensive; predetermining the selection function may thus permit increased speed in the performance of the image analysis method. Predetermined selection functions may be limited to usage with the particular staining kit and protocol for which they are determined. Different staining kits and protocols may require the determination of selection functions.

As previously described, separation step 205 may be carried out in combination with other steps of the method. FIG. 8 illustrates an embodiment in which the binary mask 503 is inverted and applied to separate tissue regions from background regions in Cb channel image 401 and Cr channel image 402 simultaneously with the application of the predetermined selection function. The exemplary predetermined selection function 810 illustrated in FIG. 8, is a direct value comparison function. Pixels for which the Cb channel value is greater than the Cr channel value are selected as nuclei pixels. This selection function is performed for those pixels identified as part of a tissue region by binary mask 503, and results in nuclei image 803. The direct value comparison selection function illustrated in FIG. 8, is illustrative only, and alternative embodiments may include any suitable function for comparing a Cb channel value to a Cr channel value, including, for example, the use of scaling multipliers or other mathematical operators. The choice of a predetermined selection function may be also be influenced by the selection of data space.

In some embodiments consistent with the present disclosure, nuclei selection step 207 may further include connected component analysis of the pixels selected by the Cb-Cr comparison. An exemplary connected component analysis may be performed as follows. A pixel identified as a nucleus pixel may be classified as connected if at least one of its four neighboring pixels is also a nucleus. A connected area may consists of all nucleus pixels that are connected through neighbors. The resultant connected areas, or blobs, may then be screened for nuclei based on various features, such as size, shape, and surrounding pixels. In alternative embodiments, nuclei selection step 207 may include separating overlapping nuclei using analysis of intensity gradients, shape analysis, multiscale processing, and other features. These techniques may improve nuclei selection accuracy.

Referring again to FIG. 2, nuclei image 803 may then be used as an input to a nuclei perimeter calculation step 208. In nuclei perimeter calculation step 208, the perimeter of the identified nuclei may be calculated.

Figure 9:
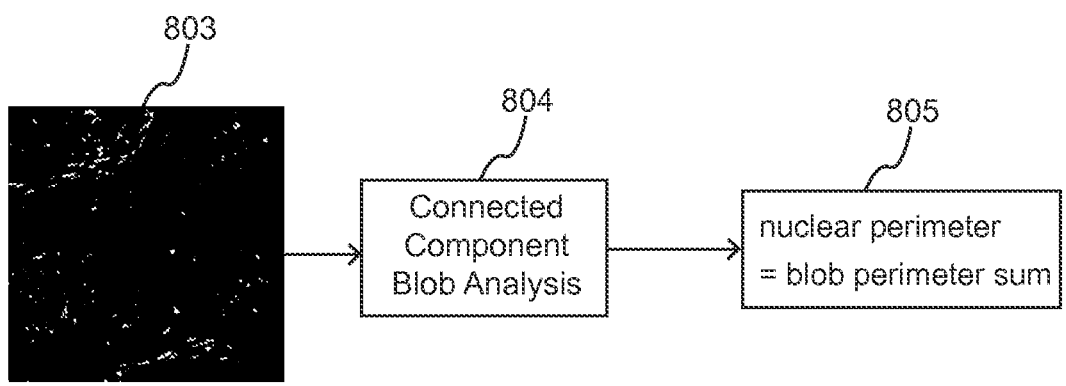
FIG. 9 illustrates an exemplary method of performing a nuclei perimeter calculation.

FIG. 9 illustrates an exemplary method of performing a nuclei perimeter calculation. As shown in FIG. 9, nuclei image 803 is subject to a connected component blob analysis 804 to identify the blobs within the image. The perimeter of each blob may then be computed, for example by determining the total number of pixels in each blob that have at least one non-blob adjacent pixel. Perimeter calculations may include corrections for diagonally neighboring pixels. The sum of the blob perimeters may represent the nuclei perimeter at block 805. In some embodiments, additional features, such as volume and shape, may be computed for each blob at this time.

Figure 10:
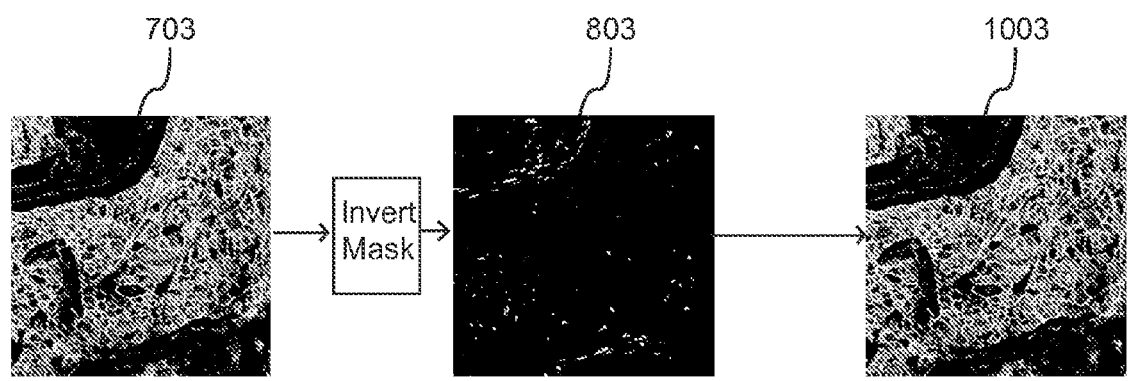
FIG. 10 illustrates an exemplary candidate membrane region separation step.

Referring again to FIG. 2, candidate membrane region separation step 209 may be performed using tissue area stain intensity image 703 and nuclei mask 803 to designate a candidate membrane region according to the tissue region and the identified nuclei. FIG. 10 illustrates an exemplary candidate membrane region separation step 209. Nuclei mask 803 identifies all pixels in the analysis region 301 that represent nuclei. Subtracting the nuclei pixels identified by nuclei mask 803 from the tissue pixels identified by tissue area stain intensity image 703 yields candidate membrane image 1003, which shows the tissue staining intensity of the candidate membrane areas. The candidate membrane region pixels may represent membrane, as well as cytoplasm and other tissue areas.

Figure 11:
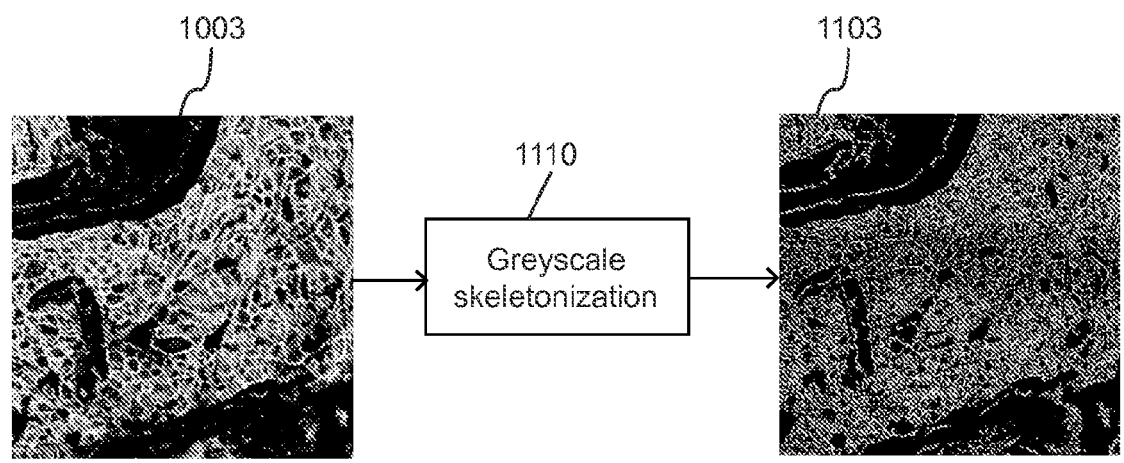
FIG. 11 illustrates an exemplary technique for refining a membrane region according to at least one predetermined refinement parameter.

Referring again to FIG. 2, membrane refinement step 210 may be performed by applying grayscale skeletonization techniques 1110 to candidate membrane image 1003. FIG. 11 illustrates refining a membrane region according to at least one predetermined refinement parameter. In the illustrated embodiment, the membrane region is skeletonized according to a predetermined skeletonization parameter. An exemplary skeletonization refinement technique may proceed as follows, using a rank filtering method. Each pixel in candidate membrane image 1003 may be compared to neighboring pixels in its 3×3 pixel neighborhood. If the pixel value is smaller or equal to the value (i.e. darker) of the neighborhood ranking pixel, then the pixel is eliminated from the candidate membrane region, that is, set to 0 (i.e. black). The neighborhood ranking pixel is the pixel in a 3×3 neighborhood having a predetermined value rank among the other pixels in the neighborhood. Thus, the neighborhood ranking pixel may be, for example, the 6th largest pixel in the 3×3 neighborhood. Performing the refinement techniques on all the pixels of candidate membrane image 1003 to refine the candidate membrane region results in membrane approximation image 1103.

The rank of the neighborhood ranking pixel used in the membrane refinement step 210 may be predetermined using data mining techniques similar to those previously described for computing other thresholds. The rank of the neighborhood ranking pixel may be considered a refinement parameter. Similarly to the other parameters described herein, a different neighborhood ranking pixel may be required for use with different staining kits and protocols. Alternatively, membrane refinement step 210 may be performed using different rank filters, or using multiple rank filters. Other refinement techniques, utilizing different refinement parameters, may also be used to refine the membrane region.

Figure 12:
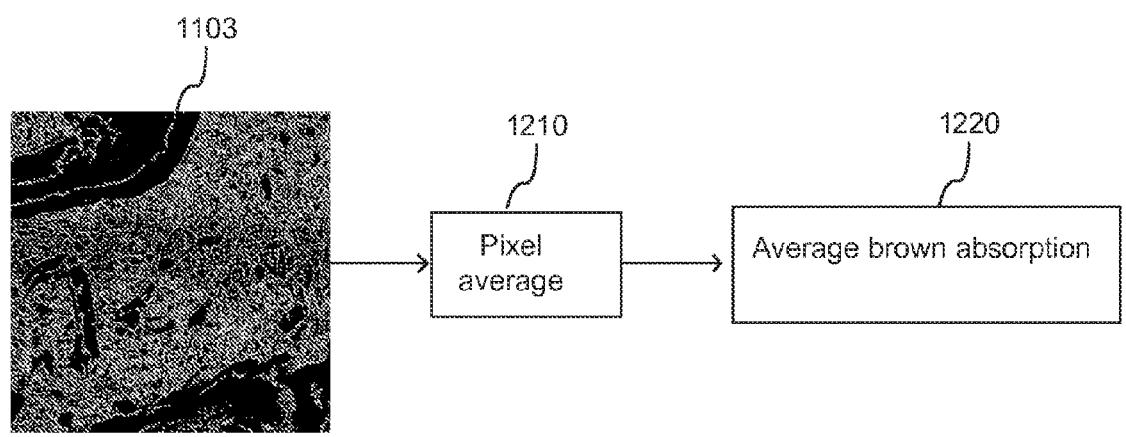
FIG. 12 illustrates an exemplary use of a membrane approximation image to compute the average membrane intensity.

Returning to FIG. 2, membrane intensity calculation step 211 may utilize membrane approximation image 1103 to compute the average membrane intensity. FIG. 12 illustrates the use of membrane approximation image 1103 to compute the average membrane intensity. The average membrane intensity is computed by averaging channel values from all pixels in analysis region 301 identified as membrane pixels by membrane approximation image 1103. In an exemplary embodiment, the channel values to be averaged may be the pixels values in a single channel of analysis region 301, such as the Cr channel or the Cb channel. In the exemplary embodiment illustrated in FIG. 12, all of the pixel values in the Cr channel of analysis region 301 corresponding to unmasked pixels of membrane approximation image 1103 are averaged at pixel averaging block 1210 to determine the average membrane intensity in terms of average brown absorption at block 1220. In alternative embodiments, the channel values to be averaged may be computed as a combination of the values in multiple channels of the image. As used herein, "average" may refer to any mathematical function that accounts for all of the values to be averaged. "Average" may refer to a simple arithmetic mean, a geometric mean, or any other suitable mathematical function for assessing a group of numbers.

Figure 13:
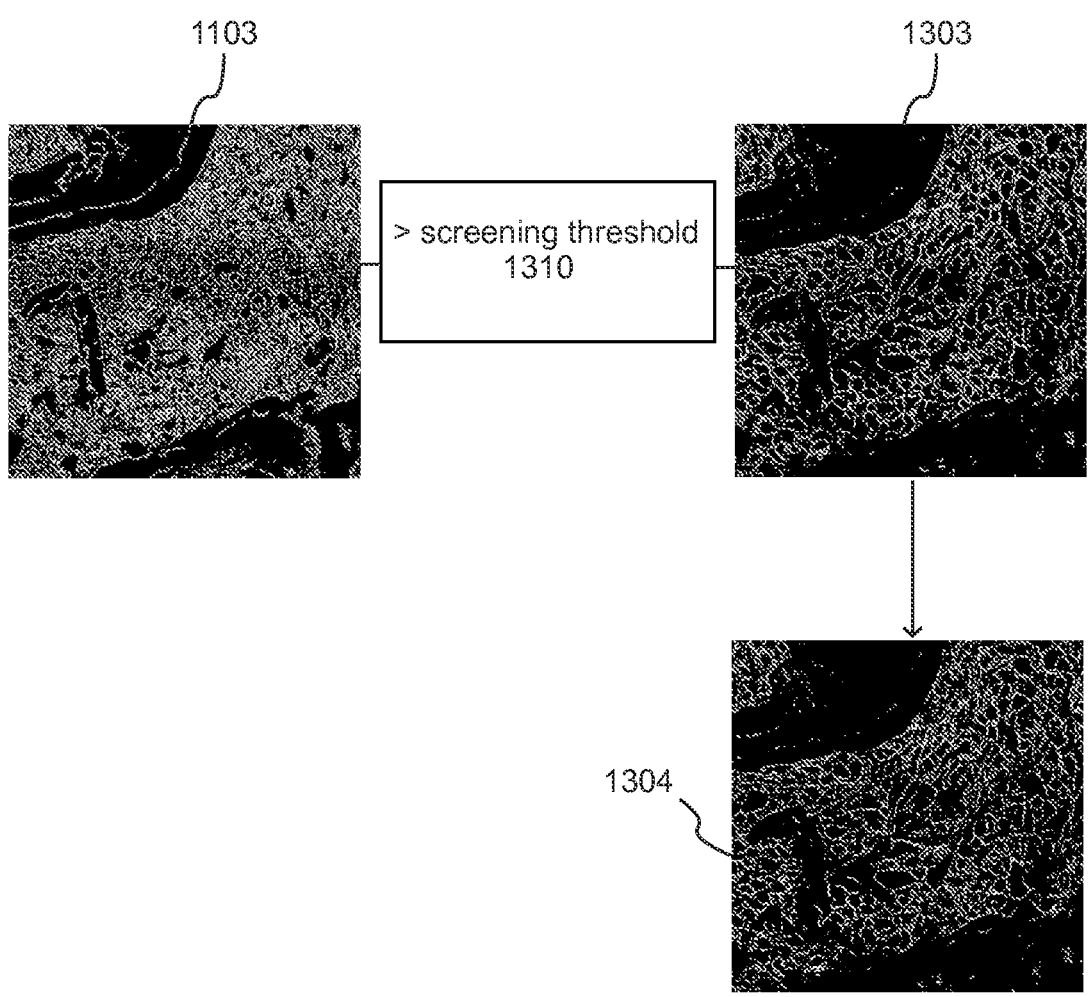
FIG. 13 illustrates an exemplary membrane screening step for reducing a membrane approximation image to a binary membrane skeleton using a screening threshold.

Referring again to FIG. 2, the average membrane intensity may be used as a screening threshold in membrane screening step 212 to determine a binary membrane skeleton. FIG. 13 illustrates an exemplary membrane screening step 212 for reducing the membrane approximation image 1103 to a binary membrane skeleton using a screening threshold.

Membrane screening step 212 may be used to determine the completion level of the membrane staining. All pixels identified as membrane pixels by membrane approximation image 1103 may be compared to a screening threshold 1310 to determine staining completeness. Those pixels exceeding the threshold 1310 may be kept, while those pixels not exceeding the threshold 1310 may be eliminated. The screening threshold 1310 may be determined through data mining sets of images manually scored for staining completion. In an exemplary embodiment, as illustrated in FIG. 13, a screening threshold 1310 may be the average membrane intensity, based on the average of the inverted Y' absorption values of the membrane pixels, as computed in step 206 in the generation of tissue area stain intensity image 703. The value of a screening threshold may vary and require recomputation based on the use of different staining kits and protocols.

The screening threshold, in the illustrated embodiment, the absorption average membrane intensity, may be used to threshold the membrane approximation image 1103 to obtain binary membrane image 1303. All remaining unmasked pixels of membrane approximation image 1103 corresponding to pixels of analysis region 301 having an inverted Y' absorption value lower than the average membrane intensity may be masked, i.e. set to black, while all remaining unmasked pixels of membrane approximation image 1103 corresponding to pixels of analysis region 301 having an inverted Y' absorption greater than the average membrane intensity may be kept, i.e. set to white. The resultant binary membrane image 1303 may then be further refined to obtain screened membrane image 1304.

Screened membrane image 1304 may be produced by reducing binary membrane image 1303 to its binary skeleton. In the illustrated exemplary embodiment, the binary skeleton is obtained through a refinement technique performed by reducing any swath of white pixels to its medial line by masking any pixels not on the medial line. Other suitable refinement techniques may be used. Screened membrane image 1304 thus includes the membrane perimeter, i.e. a single-pixel-wide outline of the membrane region. The size of the membrane perimeter may thus be calculated by counting the total number of unmasked pixels remaining in screened membrane image 1304.

Figure 14A:
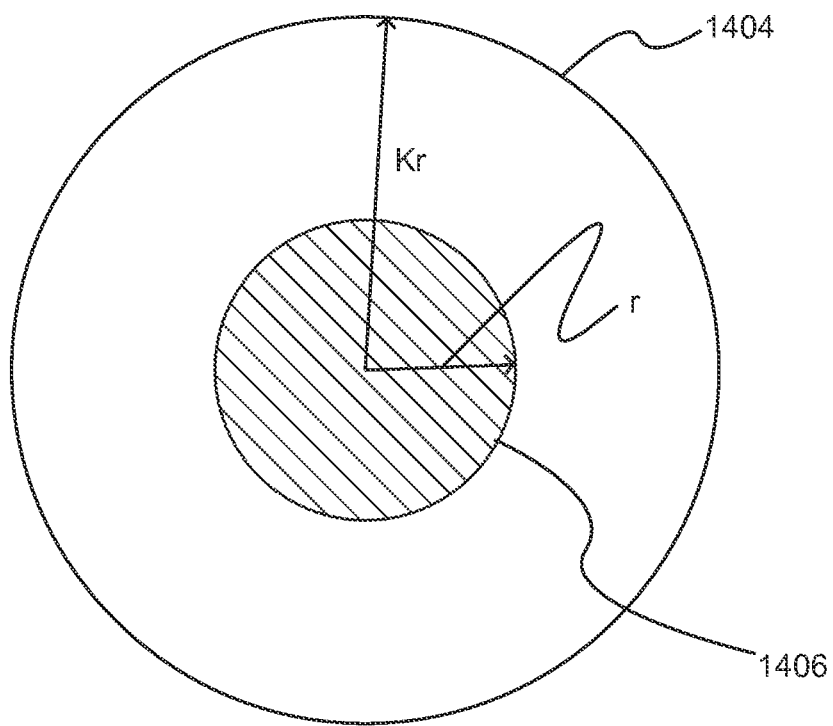
FIG. 14a illustrates an exemplary percent completion calculation model for use in a percent completion calculation step.

Referring again to FIG. 2, percent completion calculation step 213 may then be performed using the nuclei perimeter calculated in nuclei perimeter calculation step 208 and the membrane perimeter calculated in membrane screening step 212. FIG. 14a illustrates an exemplary percent completion calculation model for use in percent completion calculation step 213. As discussed above, the percent staining completion value indicates the proportion of the actual cell membrane that is stained. Step 213 compares the membrane perimeter identified by the membrane image analysis steps 209-212 with an estimated membrane perimeter to obtain a percent staining completion. The estimated membrane perimeter may be obtained as a function of the identified nuclei perimeter from step 208. Percent staining completion may thus be obtained by comparing the identified membrane perimeter with the estimated perimeter as a function of the nuclei perimeter and the membrane perimeter. The function of the nuclei perimeter used to obtain the estimated membrane perimeter may be based on an a priori model of the cell found to give the best results through data mining of manually scored slides. Such an a priori cell model may describe a relationship between the nuclear perimeter and the membrane perimeter of the cell.

Generically, the nuclear perimeter and the membrane perimeter of the cell may be related as a function of their respective distances from the center of the nucleus. For example, in the embodiment illustrated in FIG. 14, a priori cell model 1400 defines the cell as two concentric rings, including a nucleus of radius r as the inner ring and a membrane of radius K*r as the outer ring. Thus, the membrane perimeter 1404 is estimated as a circle having a radius of K*r. Because the perimeter of a circle is proportional to the radius (e.g. 2πr), the illustrated model estimates a membrane perimeter 1404 to be K times as large as the nucleus perimeter 1406. Dividing the membrane perimeter 1404 identified in step 212 by a constant proportional to the nucleus 1406 perimeter, e.g., K times the nucleus perimeter, that is, the estimated membrane perimeter, yields an estimated percentage completion value.

The cell model parameter K may be predetermined, for example, through analysis of multiple slide image data sets and/or through theoretical prediction techniques. In exemplary embodiments consistent with the present disclosure, K may have a value between 1 and 10, or higher. For example, selecting a value of approximately 2 for K may provide good results for estimating percentage completion values in breast tissue stained for Her2 detection.

Figure 14B:
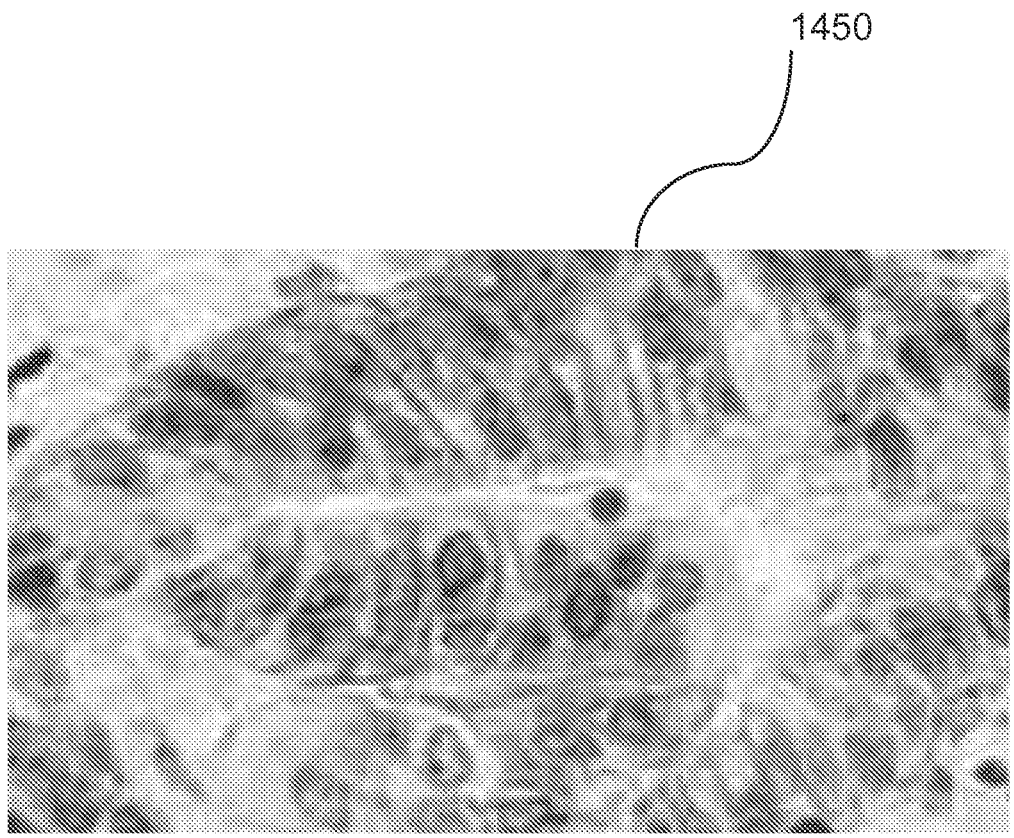
FIG. 14b illustrates a digital image of gastric tissue stained for Her2 detection.
Figure 14C:
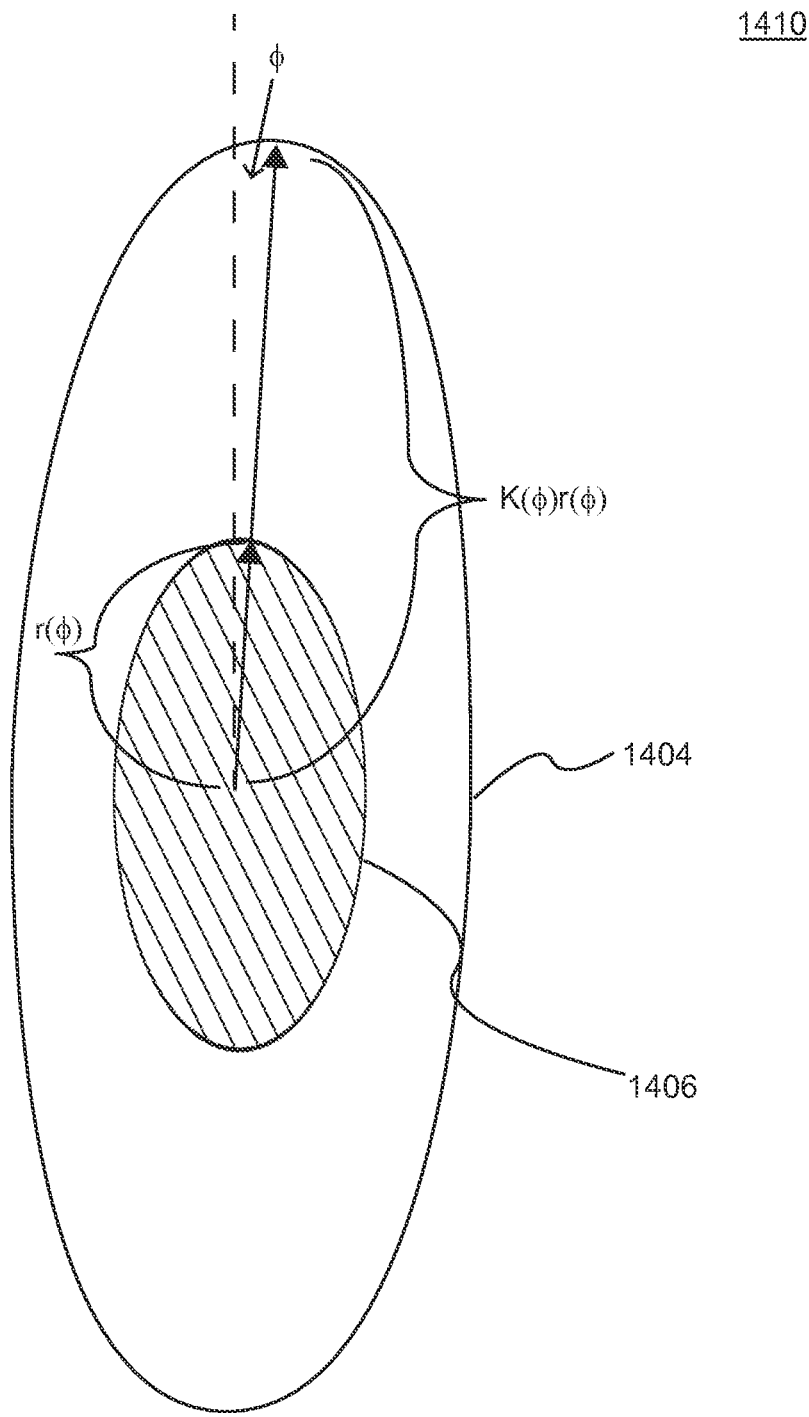
FIG. 14c illustrates an exemplary percent completion calculation model for use in a percent completion calculation step.

In other tissues, alternative cell morphology may lead to the use of alternative a priori cell models describing alternative relationships between nuclear perimeter and membrane perimeter. In a general sense, an a priori model may define a variable radius of a nuclear perimeter as a function of a rotation angle and a variable radius of a membrane perimeter as a multiple of the nuclear perimeter, wherein the multiple varies according to the rotation angle. The radius a nuclear perimeter may be defined as the distance from the center of the nucleus to the nuclear perimeter along a particular rotational angle. Thus, in polar coordinates, r may be a function of φ. K, which may be understood as the proportionality multiple between the nuclear perimeter and the membrane perimeter, may similarly vary as a function of φ. In one exemplary embodiment, a priori cell model 1410 may be used for cells having a generally elongated shape, such as gastric cancer cells. FIG. 14b illustrates gastric cancer image 1450, a digital image of gastric tissue stained for Her2 detection. The image depicts the elongated cells of gastric cancer. FIG. 14c illustrates an a priori cell model 1410 that may be utilized with methods disclosed herein to describe a relationship between nucleus perimeter 1406 and membrane perimeter 1404. As illustrated in FIG. 14c, both K and r may be functions of φ and vary according to a rotation angle. The functions of φ defining K and r may be determined through data analysis of multiple slide image data sets and/or through theoretical prediction techniques. The illustrated model and its parameters are exemplary only; other models having other parameters may be also used to obtain a function that relates the nuclei perimeter to the membrane perimeter.

The method described for calculation of percent staining completion, or, more generally, staining extent, including the illustrated model and its parameters, are exemplary only. Other methods, models, and parameters may be used to compute staining extent. For example, in alternative embodiments, a nuclear area, or other characteristic of the nuclei, may be used in place of a nuclear perimeter, with corresponding changes to the a priori model. In alternative embodiments, other a priori models may be used to obtain a function that relates nuclei parameters to membrane parameters. In further embodiments, each nucleus and membrane may be separated to compute a staining extent on a per-nucleus basis, to be averaged over analysis region 301. Such a method may include, for example, a voronoi diagram based approach to cell-membrane segmentation. In still further embodiments, the identified membrane perimeter, in addition to accounting for the presence of membrane staining, may also account for varying levels of intensity in the membrane staining.

Referring again to FIG. 2, noise filtering step 214 may be performed to filter out images having no membrane staining but small amounts of staining dots occurring in other regions. An exemplary method for performing noise filtering step 214 may be understood as follows. First, in analysis regions 301 for which the estimated percentage completion value is below a noise threshold, both the percentage completion value and the membrane intensity score, discussed in more detail below, may be set to zero. For example, an analysis region 301 may have no actual membrane staining, but, due to the automated nature of the image analysis methods disclosed, small amounts of extraneous staining dots may be incorrectly identified as part of an identified membrane perimeter. In the case where there is no actual membrane staining, these extraneously identified dots may be few in number, and lead to a very low estimated percentage completion value. If the estimated percentage completion value falls below a noise threshold, it may be determined that the image analysis region 301 contains only extraneous staining, and the values for the percentage completion value and the membrane intensity score may then be set to zero. In alternative embodiments, noise filtering step 214 may include analysis of shape characteristics over multiple filter scales or filtering at multiple scales and selecting membrane regions that disappear faster than others. A person of skill in the art will recognize that a broad range of noise filtering methods and techniques may be suitable for inclusion in noise filtering step 214.

Figure 15:
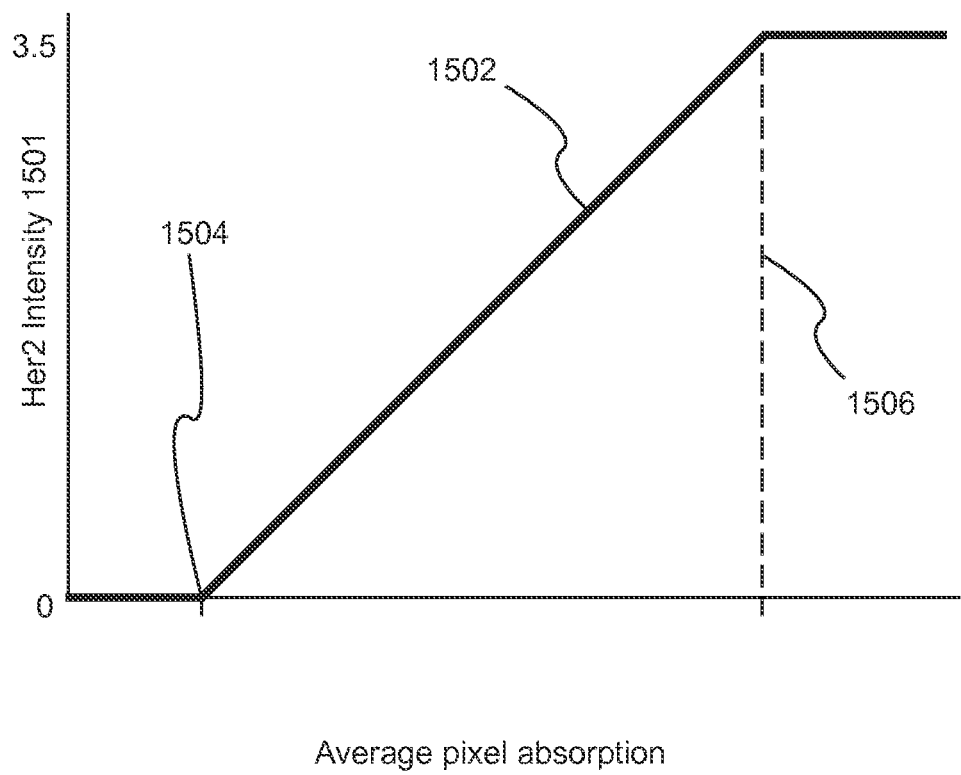
FIG. 15 illustrates an exemplary membrane intensity scoring model for mapping an average membrane intensity to an intensity score.

Returning to FIG. 2, membrane intensity scoring step 215 may next use a predetermined model to compute a membrane intensity score based on the average membrane intensity computed in membrane intensity calculation step 211. A data mining exercise similar to that used to compute the screening threshold at membrane screening step 212 may also be used to compute a membrane intensity scoring model. In an exemplary embodiment, brown absorption average membrane intensities for a broad range of slides were compared to pathologist produced Her2 intensity scores to determine an appropriate membrane intensity scoring model. FIG. 15 illustrates an exemplary Her2 membrane intensity scoring model for mapping a brown absorption average membrane intensity to a Her2 intensity score 1501. The exemplary illustrated Her2 intensity score model 1510 includes upper and lower cutoffs 1506, 1504 and a linear fit 1502 between them. Her2 intensity score model 1510 is exemplary only, and other suitable models having different structures and different parameters may be produced based on data mining exercises. Her2 intensity score models may be specific to a particular staining kit and protocol.

Figure 16:
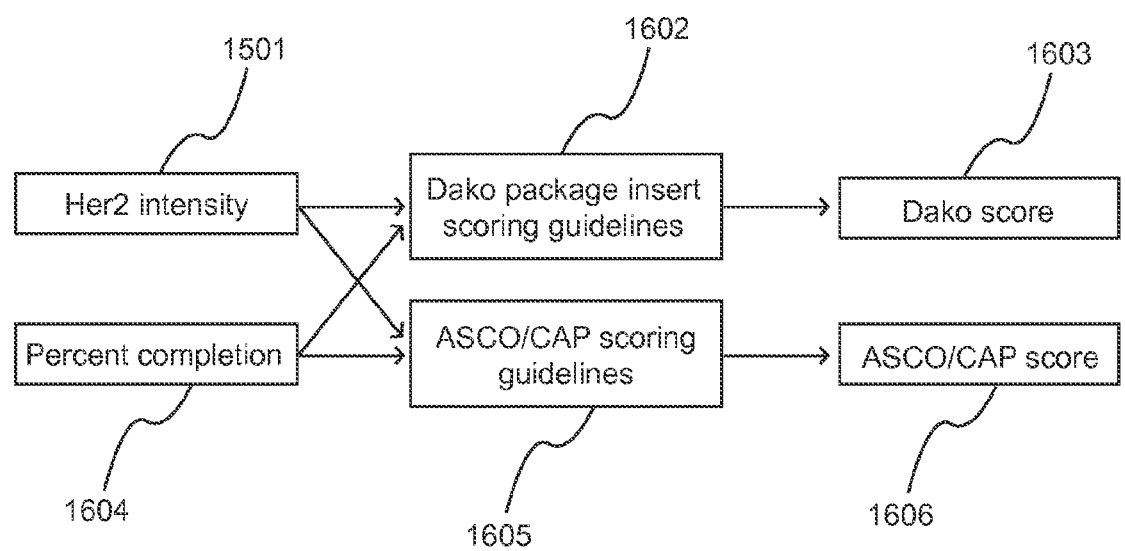
FIG. 16 is a flowchart illustrating the use of a membrane intensity score and a percent completion value to determine final expression scores for analysis region.

Referring again to FIG. 2, final scoring step 216 may use the computed membrane intensity score and percent completion value for analysis region 301 to compute a final analysis region score based on the appropriate scoring guidelines. FIG. 16 is a flowchart illustrating the use of a Her2 membrane intensity score 1501 and a percent completion value 1604 to determine final scores for analysis region 301. As illustrated in FIG. 16, a Her2 membrane intensity score 1501 and a percent completion score 1604 are used in conjunction with Dako or ASCO/CAP scoring guidelines 1602, 1604 to produce final Dako or ASCO/CAP scores 1603, 1606 for analysis region 301.

Figure 17:
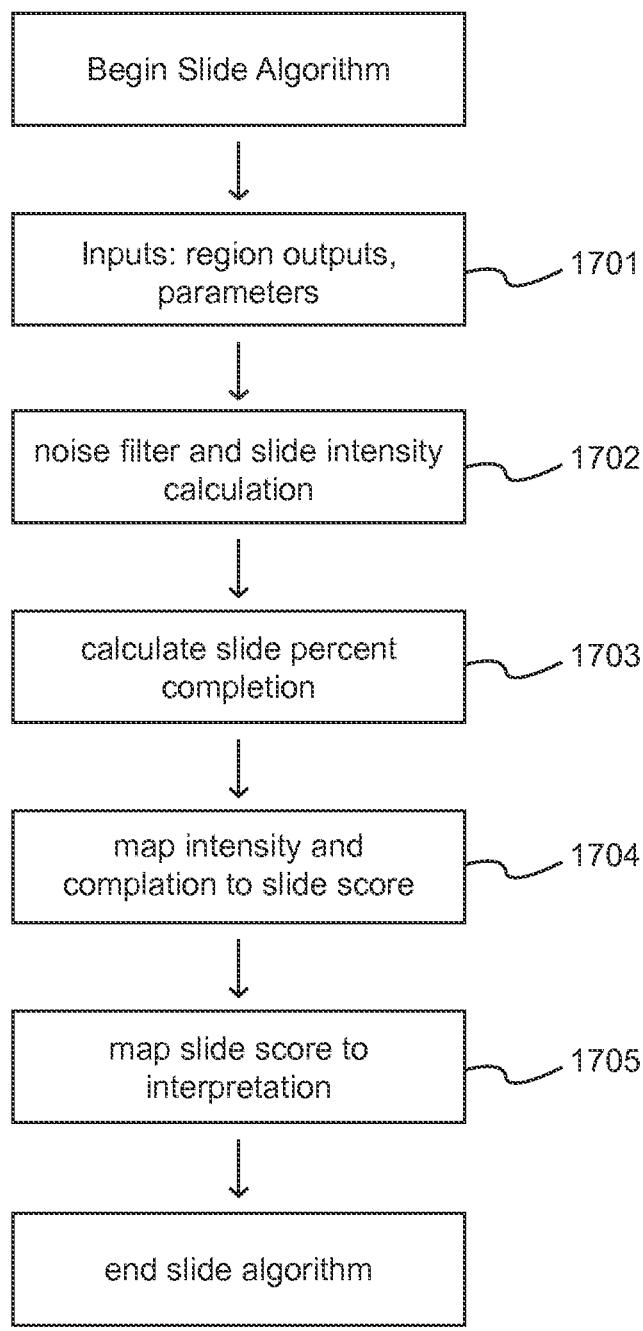
FIG. 17 is a flowchart depicting an exemplary method for determining an overall slide score.

FIG. 17 is a flowchart depicting an exemplary method for determining an overall slide score. In an exemplary embodiment, digital image 300 may represent an entire slide. Alternatively, a plurality of digital images may represent a slide. As described above, in step 202, an analysis region 301 may be separated from original digital pathology image 300. Analysis region 301 may also include the entirety of digital pathology image 300. In an exemplary method for determining an overall slide score, scores from multiple analysis regions 301, which may encompass the entire digital image 300, or even multiple digital images representing a slide, may be combined. The method discussed below relates to scoring an entire slide, but the method as described may be carried out to determine an overall image score for any complete image. At input step 1701, the overall slide scoring method may receive inputs from multiple analysis regions. These inputs may include, for each analysis region, any data produced and any parameters or thresholds used during the expression scoring method illustrated in FIG. 2. For instance, identified membrane perimeter, identified nuclei perimeter, estimated membrane perimeter, and average membrane intensity may be used.

Figure 18:
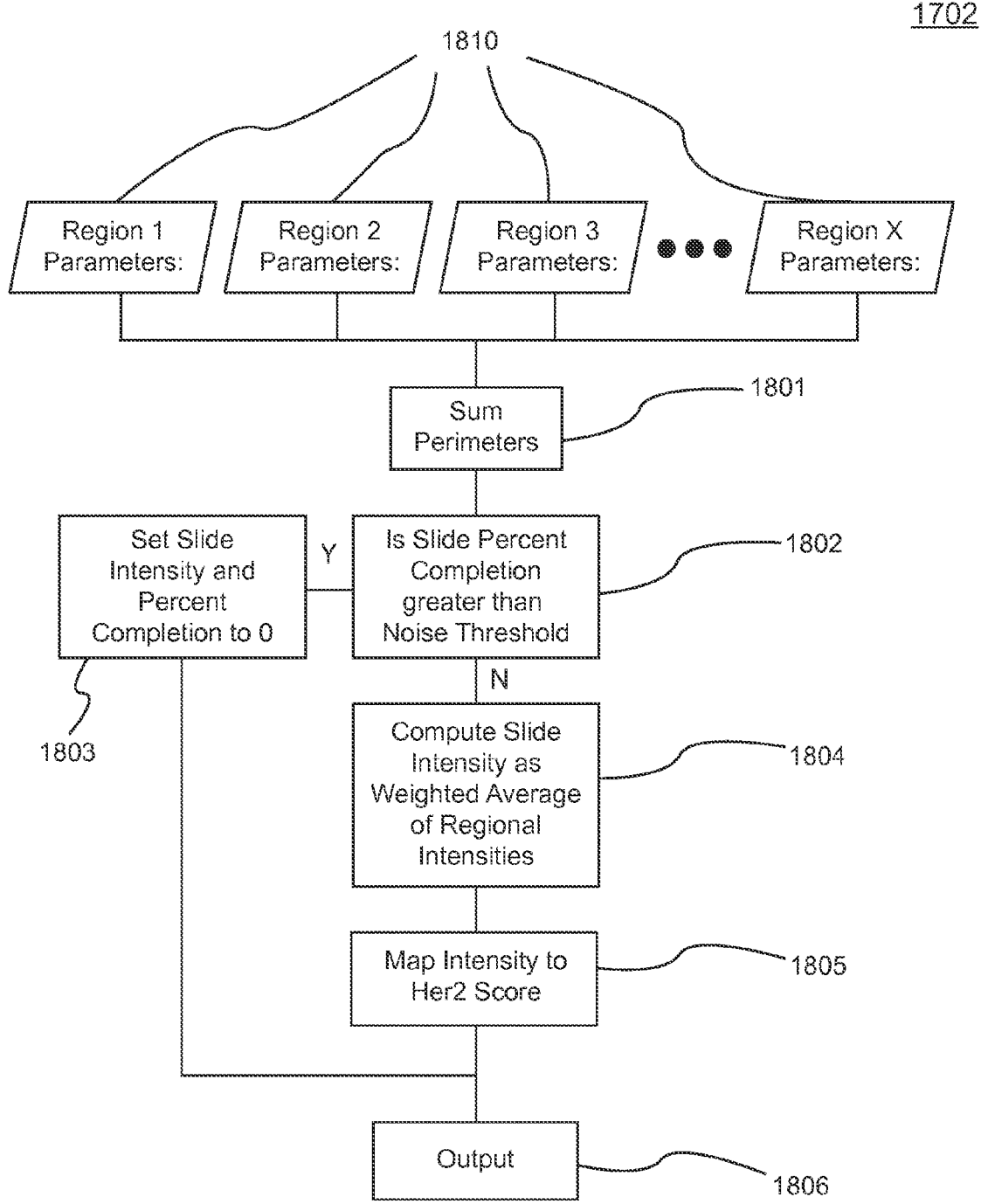
FIG. 18 illustrates an exemplary noise filtering and slide intensity calculation step in a method for determining an overall slide score.

In noise filter and slide intensity calculation step 1702, an overall slide intensity may be calculated, subject to noise filtering constraints. FIG. 18 illustrates an exemplary noise filtering and slide intensity calculation step in a method for determining an overall slide score. The slide membrane and nuclear perimeter may be calculated as the sum of the region perimeters 1810, as shown in FIG. 18, at step 1801. A noise threshold, similar to that used in step 214, may then be used to determine if there is an extraneous staining noise spike in place of real membrane staining, at step 1802. If the check indicates noise, e.g., the percent staining completion, as calculated from the summed membrane and nuclear perimeters, is below the noise threshold, then intensity and percent completion may be set to zero for the slide, at step 1803. Otherwise, the slide average intensity may be calculated, at step 1804, as a weighted average of region intensities, weighted by the sum of each region's membrane perimeter and nuclear perimeter. The slide average intensity score may then be mapped to a Her2 slide intensity score, at step 1805, using the same model as described with respect to FIG. 15 or other suitable model. The results from noise filter and slide intensity calculation step 1702 may then be output to step 1703 at step 1806.

Next, in slide percent completion step 1703, slide percent completion may be computed if the slide has passed through the noise filtering of step 1702. The same function as that used in step 214 to determine percent completion based on a cell model may also be used to compute entire slide completion. Entire slide completion may be calculated from the identified membrane and nuclei perimeters of all analysis regions 301. Entire slide completion may also be calculated as a weighted average of analysis region 301 percent completion scores, weighted by the sum of each region's membrane perimeter and nuclear perimeter.

The slide percent completion value from step 1703 and Her2 slide intensity value from step 1702 may then be used, at step 1704, to compute a final slide score. As described with respect to FIG. 16, the same guidelines may be used to calculate a Dako or ASCO/CAP score for the entire slide.

Finally, at step 1705, the final slide score may then be used with interpretation rules to determine a final diagnostic interpretation of the slide. The assistance of a pathologist or doctor may be used to assess the final diagnostic interpretation, but is not necessary.

Embodiments of the methods disclosed herein may serve to reduce analysis time or reduce the computing resources required to perform these analyses. The methods disclosed herein utilize several predetermined parameters and thresholds, computed specifically to work with particular staining kits and protocols. By using predetermined parameters and thresholds, and by performing certain estimations during processing, the exemplary methods and techniques described herein eliminate the need for certain time consuming analysis techniques. For example, conventional techniques may utilize various feature extraction or blob recognition techniques to identify each nucleus within an analysis region, and then use additional analysis techniques in conjunction with the identified nuclei to a identify cell membrane region. This type of analysis may be time consuming and resource intensive as it identifies and localizes various tissue structures within a cell. Inventive methods and techniques disclosed herein recognize that, for the purposes of scoring a complete image or entire slide, it may not be necessary to identify and analyze each individual nucleus and cell membrane, but only to assess the nuclei and the cell membrane region in each image or analysis region in their entirety. By using a series of previously determined thresholds and parameters the resource intensive computations may be performed a single time for a given staining protocol and test kit, and may be used to make accurate estimations of the overall extent of the nuclei and cell membrane regions within a particular slide or image.

Conventional techniques may use various image analysis techniques, such as edge gradients, color segmentation, and spatial processing to identify and isolate a membrane in order to measure the extent of staining Again, these types of analyses may be time consuming and resource intensive. Inventive methods and techniques disclosed herein may serve to reduce processing time and resource usage by providing methods of estimating extent of staining according to previously determined membrane size estimates that have been derived through extensive data mining of previously scored slides.

Embodiments of the methods and techniques disclosed herein may be implemented as instructions to be carried out by at least one processor. As used herein, the term "processor" may include an electric circuit that performs a logic operation on an input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be configured to perform an action if it is provided with access to, is programmed with, includes, or is otherwise made capable carrying out instructions for performing the action. The at least one processor may be provided with such instructions either directly through information permanently or temporarily maintained in the processor, or through instructions accessed by or provided to the processor. Instructions provided to the processor may be provided in the form of a computer program comprising instructions tangibly embodied on an information carrier, e.g., in a machine-readable storage device, or any tangible computer-readable medium. A computer program may be written in any form of programming language, including compiled or interpreted languages, and it can be deployed in any form, including as a standalone program or as one or more modules, components, subroutines, or other unit suitable for use in a computing environment. The at least one processor may include specialized hardware, general hardware, or a combination of both to execute related instructions. The processor may also include an integrated communications interface, or a communications interface may be included separate and apart from the processor. The at least one processor may be configured to perform a specified function through a connection to a memory location or storage device in which instructions to perform that function are stored.

The foregoing methods and systems have been described in relation to particular embodiments which are intended in all respects to be illustrative rather than restrictive. Those skilled in the art will appreciate that many different combinations of hardware will be suitable for practicing the present invention.

From the foregoing description, it will be appreciated that the methods and apparatus described herein to score digital pathology images of stained slides may be adapted to score any digital pathology images, and not only those described with respect to particular embodiments. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for analyzing a digital pathology image, the method comprising:
    selecting at least one analysis region in the digital pathology image;
    separating the at least one analysis region into a tissue region and a background region using a predetermined separation threshold;
    selecting nuclei within the tissue region;
    determining an estimated membrane perimeter;
    designating a membrane region according to the tissue region and the selected nuclei;
    calculating an actual membrane perimeter of the membrane region; and
    calculating a staining extent by comparing the estimated membrane perimeter and the actual membrane perimeter.

2. The method of claim 1, further comprising:
    designating a nucleus region based on the selected nuclei;
    calculating a nuclear perimeter based on a priori cell model; and
    wherein determining the estimated membrane perimeter is based, at least in part, on the nuclear perimeter.

3. The method of claim 2, further comprising:
    refining the membrane region according to at least one skeletonization parameter, the skeletonization parameter including a rank filter parameter.

4. The method of claim 3, wherein refining the membrane region comprises:
    evaluating a pixel rank of a plurality of membrane region pixels within a pixel neighborhood; and
    eliminating from the membrane region pixels having a pixel rank lower than the rank filter parameter.

5. The method of claim 3, further comprising:
    generating a membrane intensity score of the refined membrane region according to a predetermined model; and
    generating a score for the analysis region according to the membrane intensity score and the staining extent.

6. The method of claim 1, wherein calculating the actual membrane perimeter of the membrane region further comprises:
    calculating an average value of at least one channel value in the membrane region;
    applying a threshold to the membrane region according to the average value to obtain a binary membrane region;
    reducing the binary membrane region to a binary skeleton; and
    determining an actual perimeter of the membrane region as a number of pixels in the binary skeleton.

7. A method for analyzing a digital pathology image, the method comprising:
    selecting one or more prospective pixels within a tissue region as nuclei pixels based on a predetermined selection function;
    determining whether at least a predetermined number of pixels surrounding the one or more prospective pixels are also nuclei pixels;
    identifying one or more prospective pixels as connected pixels when at least the predetermined number of pixels surrounding the one or more prospective pixels are determined to be nuclei pixels;
    identifying a nucleus region based on a perimeter of the connected pixels; and
    designating a membrane region according to the tissue region and the nucleus region.

8. The method of claim 7, wherein the tissue region is generated by:
    selecting at least one analysis region in the digital pathology image; and
    separating the at least one analysis region into the tissue region and a background region using a predetermined separation threshold.

9. The method of claim 8, wherein the at least one analysis region includes the entire digital pathology image.

10. The method of claim 8, wherein
    the digital pathology image comprises at least a first data channel, a second data channel, and a third data channel;
    the predetermined separation threshold is based on a first data channel value; and
    the predetermined selection function comprises comparing a second data channel value and a third data channel value.

11. The method of claim 10, wherein the comparison between the second data channel value and the third data channel value includes determining a maximum value from among the second data channel value and the third data channel value.

12. The method of claim 7, further comprising:
    refining the membrane region according to at least one predetermined refinement parameter; and
    generating a membrane intensity score of the refined membrane region according to a predetermined model.

13. The method according to claim 12, wherein generating the membrane intensity score of the refined membrane region comprises calculating an average channel value of a plurality of the pixels of the refined membrane region.

14. The method according to claim 12, wherein the at least one predetermined refinement parameter includes a rank filter parameter, and
    refining the membrane region comprises:
        evaluating a pixel rank for a plurality of membrane region pixels within a pixel neighborhood; and
        eliminating from the membrane region pixels having a pixel rank lower than the rank filter parameter.

15. The method of claim 7, further comprising:
    refining the membrane region according to at least one predetermined refinement parameter;
    generating a membrane intensity score of the refined membrane region according to a predetermined model;
    calculating a first perimeter of the nucleus region;
    calculating a second perimeter of the refined membrane region;
    calculating a staining extent as a function of the first perimeter and the second perimeter; and
    scoring an analysis region according to the membrane intensity score and the staining extent.

16. The method of claim 15, wherein refining the membrane region according to at least one predetermined refinement parameter comprises:
    computing an average value of at least one data channel value in the membrane region;
    thresholding the membrane region according to the computed average value to obtain a binary membrane region; and
    reducing the binary membrane region to a binary skeleton.

17. The method of claim 15, wherein calculating the staining extent as a function of the first perimeter and the second perimeter comprises utilizing a priori model defining a first variable radius of the first perimeter as a function of a rotation angle and a second variable radius of the second perimeter as a multiple of the first variable radius, wherein the multiple varies according to the rotation angle.

18. The method of claim 15, wherein calculating the staining extent as a function of the first perimeter and the second perimeter comprises dividing the second perimeter by a constant proportional to the first perimeter.

19. The method of claim 18, wherein the constant proportional to the first perimeter is two times the first perimeter.

20. The method of claim 7, wherein identifying the one or more prospective pixels as connected pixels comprises performing connected component analysis on the one or more prospective pixels.

* * * * *

UNITED STATES PATENT AND TRADEMARK OFFICE
CERTIFICATE OF CORRECTION

PATENT NO. : 9,607,376 B2  
APPLICATION NO. : 14/817508  
DATED : March 28, 2017  
INVENTOR(S) : Rohit Jain et al.

Page 1 of 1

It is certified that error appears in the above-identified patent and that said Letters Patent is hereby corrected as shown below:

In the Specification

In Column 1, Line 31, delete "staining" and insert -- staining. --, therefor.

In Column 1, Line 56, delete "staining" and insert -- staining. --, therefor.

In Column 4, Line 19, delete "scanning" and insert -- scanning. --, therefor.

In Column 4, Line 57, delete "staining" and insert -- staining. --, therefor.

In Column 5, Line 6, delete "staining" and insert -- staining. --, therefor.

In Column 5, Line 29, delete "staining" and insert -- staining. --, therefor.

In Column 7, Line 63, delete "$B'_D))$" and insert -- $B'_D)$ --, therefor.

In Column 7, Line 65, delete "$B'_D))$" and insert -- $B'_D)$ --, therefor.

In Column 17, Line 35, delete "staining" and insert -- staining. --, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*